(12) United States Patent
Ochi

(10) Patent No.: US 6,796,153 B2
(45) Date of Patent: Sep. 28, 2004

(54) STEERING LOCK APPARATUS

(75) Inventor: Isao Ochi, Aki-gun (JP)

(73) Assignee: U-Shin Ltd., Tokyo (JP)

( * ) Notice: Subject to any disclaimer, the term of this patent is extended or adjusted under 35 U.S.C. 154(b) by 0 days.

(21) Appl. No.: 10/303,758

(22) Filed: Nov. 26, 2002

(65) Prior Publication Data

US 2004/0099024 A1 May 27, 2004

(51) Int. Cl.$^7$ .............................................. B60R 25/00
(52) U.S. Cl. ................................................ 70/186; 70/252
(58) Field of Search ......................... 70/182–186, 252, 70/278.7, 360

(56) References Cited

U.S. PATENT DOCUMENTS

| | | | | |
|---|---|---|---|---|
| 3,708,032 A | * | 1/1973 | Suzuki | 180/287 |
| 4,332,306 A | * | 6/1982 | Turatti | 180/287 |
| 4,827,744 A | * | 5/1989 | Namazue et al. | 70/252 |
| 5,927,112 A | * | 7/1999 | Yamashita | 70/252 |
| 6,003,349 A | * | 12/1999 | Nagae et al. | 70/186 |
| 6,442,985 B1 | * | 9/2002 | Watanuki et al. | 70/186 |
| 6,604,392 B1 | * | 8/2003 | Kiso et al. | 70/186 |
| 2002/0178769 A1 | * | 12/2002 | Okuno | 70/186 |
| 2003/0015006 A1 | * | 1/2003 | Tamukai | 70/186 |
| 2003/0079509 A1 | * | 5/2003 | Ochi | 70/186 |

FOREIGN PATENT DOCUMENTS

| | | | | |
|---|---|---|---|---|
| FR | 1487276 | * | 5/1967 | 70/186 |
| JP | 0138047 | * | 10/1981 | 70/252 |
| JP | 61-28851 | | 8/1986 | |
| JP | 3029059 | | 4/1993 | |

* cited by examiner

Primary Examiner—Lloyd A. Gall
(74) Attorney, Agent, or Firm—Wenderoth, Lind & Ponack, L.L.P.

(57) ABSTRACT

A steering lock apparatus comprises: rotational members 1, 2 having an engagement recess portion 3; an operating portion 21 positioned connected to the rotational members 1, 2; a holder 4 for holding the rotational members 1, 2 movably in forward and backward directions and for holding the same rotatably in a rear position; an actuator 9 driven by a signal transmitted by a controller upon detection of the rotational members 1, 2 being operated to a rear side; and a lock member 11 that is operated by the actuator 9 and inserted into the engagement recess portion 3 of the rotational members 1, 2 for preventing rotation of the rotational members 1, 2. Also, an engagement release position where the engagement of the engagement recess portion 3 of the rotational members 1, 2 and the lock member 11 is released is provided between a front position and a rear position, and a prevention mechanism 28, 58 for preventing rotation of the rotational members 1, 2 is provided so as to prevent engagement of the lock member 11 and a lateral wall of the engagement recess portion 3 of the rotational members 1, 2 in the engagement release position.

1 Claim, 14 Drawing Sheets

STEERING LOCK APPARATUS

BACKGROUND OF THE INVENTION

The present invention relates to a steering lock apparatus for use in vehicles and the like.

Conventionally, a cylinder lock that allows locking and unlocking without a key has been disclosed in e.g., Japanese Utility Model Kokoku Publication No. 61-28851. This cylinder lock has a rotor equipped with tumblers, and a rotational cylinder with a tumbler engagement groove formed on the inner circumferential face is provided on the outer circumferential face of the rotor. On the outer circumferential face of the rotational cylinder, there is provided a hole for fitting a top end portion of a plunger driven by an electromagnetic solenoid. When the electromagnetic solenoid is off, the plunger is fit into the hole to prevent rotation of the rotational cylinder, whereas when the electromagnetic solenoid is on, the plunger comes out of the hole to bring the rotational cylinder into a rotatable state. For unlocking the cylinder lock with use of a key, the key is inserted into the rotor so that the tumblers sink into the rotor, which releases engagement between the tumblers and the rotational cylinder and thereby enables the rotor to rotate in precisely the same way as general cylinder locks. For unlocking the cylinder lock without use of a key, the electromagnetic solenoid is operated to pull the plunger out of the hole of the rotational cylinder so as to make the rotational cylinder rotatable. Consequently, holding and rotating a knob provided on the front face of the rotor implements cooperative rotation of the rotor and the rotational cylinder since the tumblers of the rotor are in engagement with the tumbler engagement groove of the rotational cylinder.

However in the above-mentioned known steering lock apparatus, if the rotational cylinder is under rotating operation when the electromagnetic solenoid is turned on and the top end portion of the plunger is about to escape from the hole, the top end portion of the plunger comes into contact with the lateral wall of the hole and is caught thereon, which may cause a disadvantage that the rotational cylinder is not unlocked even if the electromagnetic solenoid is turned on.

SUMMARY OF THE INVENTION

In order to solve the above problem, a steering lock apparatus of the present invention is composed of: a rotational member having an engagement recess portion; an operating portion positioned in a front side of the rotational member and connected to the rotational member; a holder for holding the rotational member movably in forward and backward directions and for holding the same rotatably in a rear position; an actuator driven by a signal transmitted by a controller upon detection of the rotational member being operated to a rear side; and a lock member that is operated by the actuator and inserted into the engagement recess portion of the rotational member for preventing rotation of the rotational member, wherein an engagement release position where the engagement of the engagement recess portion of the rotational member and the lock member is released is provided between a front position and a rear position, and a prevention means for preventing rotation of the rotational member is provided so as to prevent engagement of the lock member and a lateral wall of the engagement recess portion of the rotational member in the engagement release position.

In such a structure, when the lock member gets out of the engagement recess portion of the rotational member to unlock the rotational member, rotation of the rotational member is prevented by the prevention means if rotational force is added to the rotational member, which prevents engagement between the lateral wall of the engagement recess portion of the rotational member and the lock member, thereby ensuring execution of unlocking operation.

BRIEF DESCRIPTION OF THE DRAWINGS

The present invention will be further described with reference to the accompanying drawings wherein like reference numerals refer to like parts in the several views, and wherein:

FIG. 8A is an enlarged fragmental view showing a relation between an engagement recess portion of a rotational member and a lock member in the state of FIG. 1, while

FIG. 9A is an enlarged fragmental view showing relation between the engagement recess portion of the rotational member and the lock member in the state of FIG. 3, while

FIG. 10A is an enlarged fragmental view showing a relation between the engagement recess portion of the rotational member and the lock member in the state of FIG. 4, while

FIG. 14A is an enlarged cross sectional view of FIG. 1 taken along line A—A, while

DETAILED DESCRIPTION OF THE PREFERRED EMBODIMENTS

Figure 1:
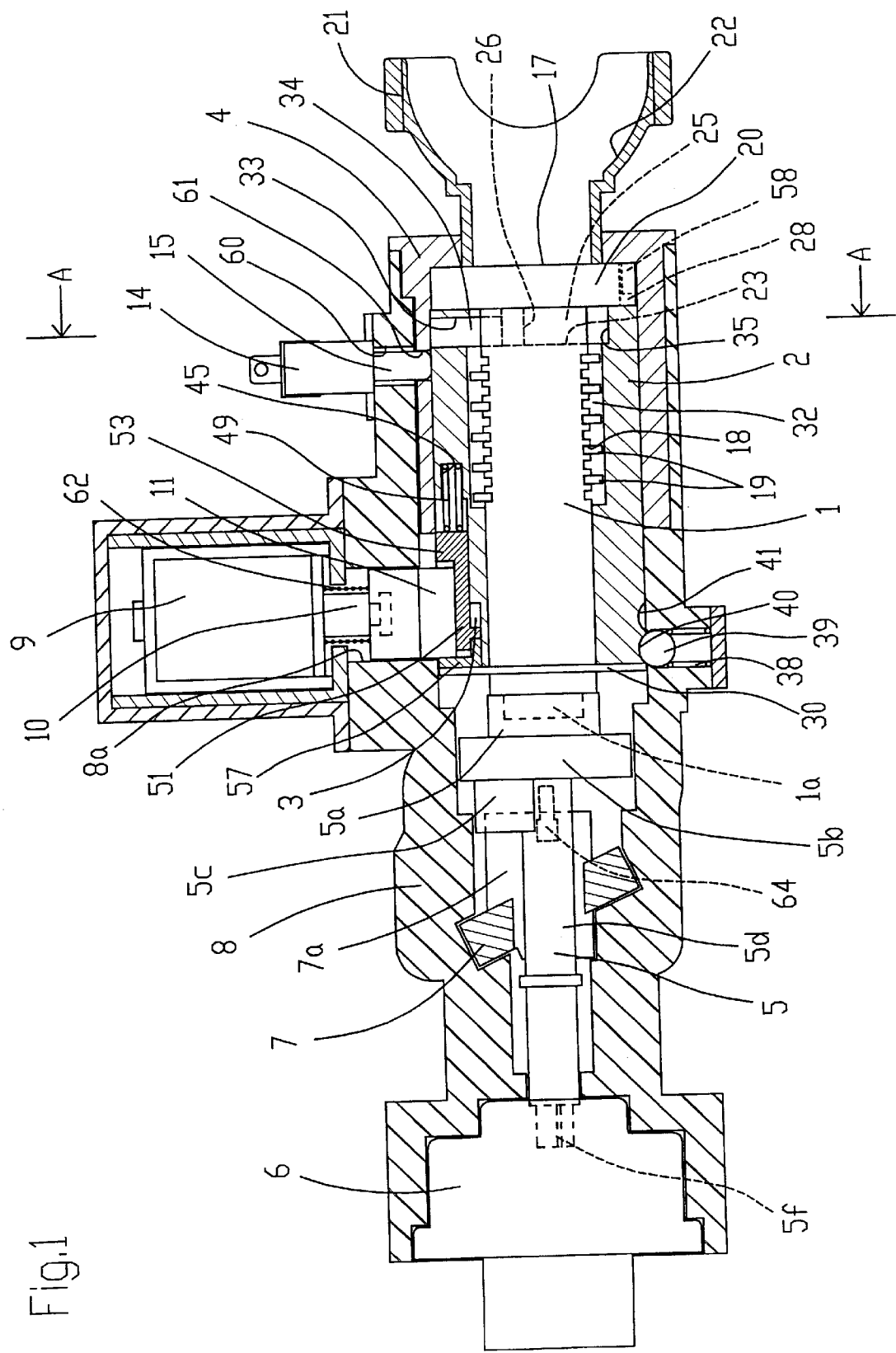
FIG. 1 is a cross sectional view showing a steering lock apparatus of the present invention in the state of being locked.
Figure 2:
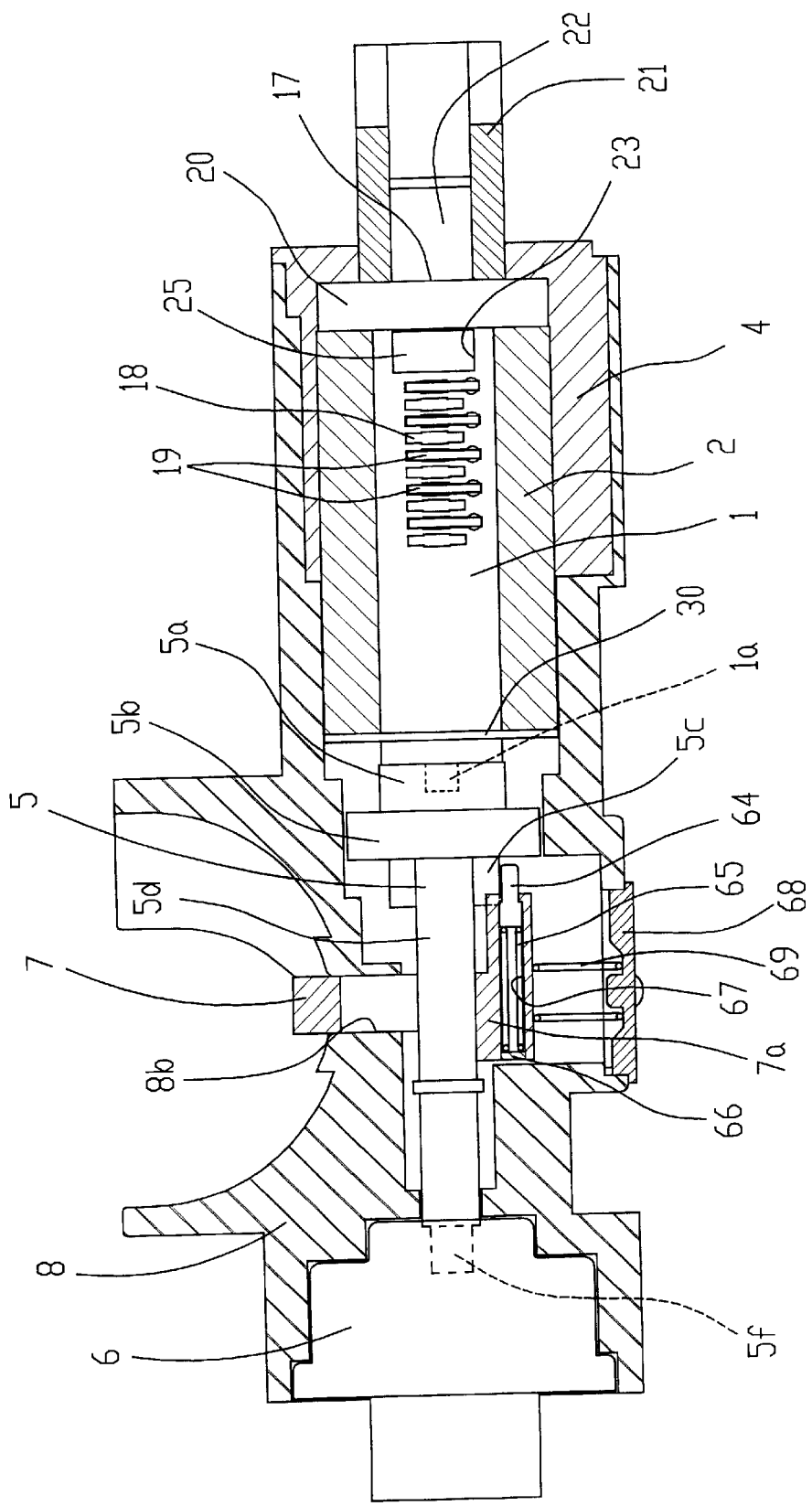
FIG. 2 is a cross sectional view displaced by 90° from the cross sectional view of FIG. 1 showing the steering lock apparatus of the present invention in the state of being locked.

FIG. 1 is a cross sectional view showing a steering lock apparatus of the present invention before operation, and FIG. 2 is a cross sectional view displaced by 90 from the cross sectional view of FIG. 1. It is noted that in the cross sectional view showing the steering lock apparatus, the right side is referred to as "front" and the left side is referred to as "rear" in the longitudinal direction for the sake of convenience.

The steering lock apparatus has a key cylinder 1 with an operating knob (operating portion) 21 secured on the front face, and a rotor 2 for holding the key cylinder 1 in a movable manner. The key cylinder 1 and the rotor 2 constitute a rotational member. On the rear outer circumferential portion of the rotor 2, there is formed a slide groove 3 that engages with a later-described lock member 11. Also, the rotor 2 is held by a holder 4 movably in forward and backward directions, i.e., left and right directions in the drawing as well as held rotatably in a rear position on the left side of the drawing.

It is noted that the key cylinder 1 and the rotor 2 are located in the front position on the right side of the drawing before operation as shown in FIG. 1.

The key cylinder 1 is connected to a cam member 5 via a connection protruding portion 1a. Rotating the key cylinder 1 cooperatively rotates the cam member 5, which rotates a rotor (not shown) of a switch portion 6 provided on the rear end side of the cam member 5, resulting in execution of a specified switch operation. Also, rotation of the cam member 5 operates a lock shaft 7, by which an unshown steering shaft is locked.

Each of the above-described members is housed in a body 8. On the body 8, there is fixed an electromagnetic solenoid 9 that is an actuator. In a connection hole 8a formed on the body 8, there is operatively disposed a lock member 11 connected to the top end portion of a driving shaft 10 of the electromagnetic solenoid 9. The lock member 11 engages with the slide groove 3 of the rotor 2 to restrain rotating operation of the rotor 2. On the outer circumferential wall in a specified position of the body 8, there is fixed a key detection switch 14 for detecting insertion of a mechanical key into the key cylinder 1. The key detection switch 14 is equipped with an actuating lever 15, which conducts a current to the key detection switch 14 when pressed. The actuating lever 15 is inserted into a switch introduction hole 60 formed in the body 8 and a through-hole 61 formed in the holder 4 in the state of being pressed outside by an unshown spring disposed in the key detection switch 14.

Figure 15:
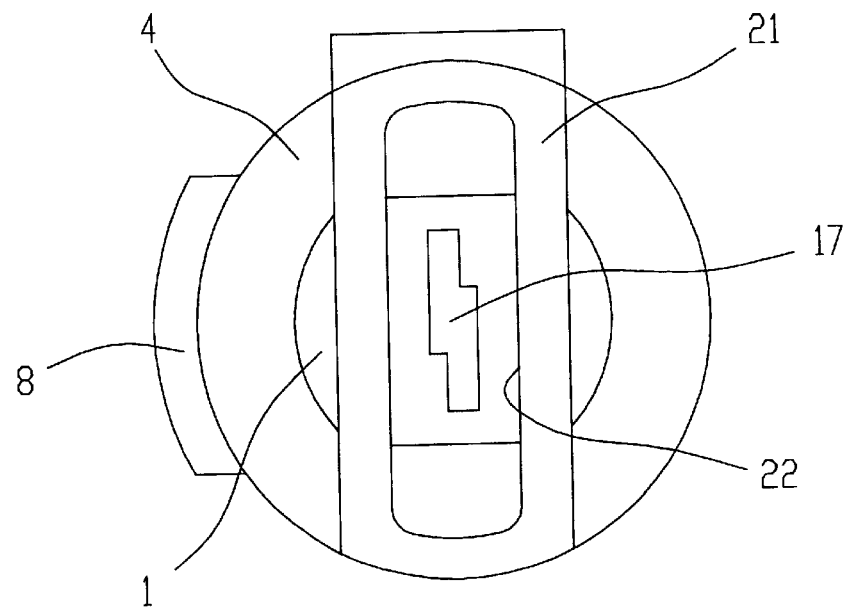
FIG. 15 is a side view showing the front side of the steering lock apparatus of the present invention.

The key cylinder 1 has a column shape, and a key insertion hole 17 into which the mechanical key is inserted is formed in the center portion thereof as shown in FIG. 1 and FIG. 15. On the outer circumferential face of the key cylinder 1, a plurality of tumbler holes 18 connected to the key insertion hole 17 are provided from both sides at specified intervals in the axial direction. In each of the tumbler holes 18, there is provided a tumbler 19 pressed in the radial direction by an unshown spring. Similar to known cylinder locks, when a key is inserted into the key insertion hole 17, each tumbler 19 sinks into the key cylinder 1.

Figure 11:
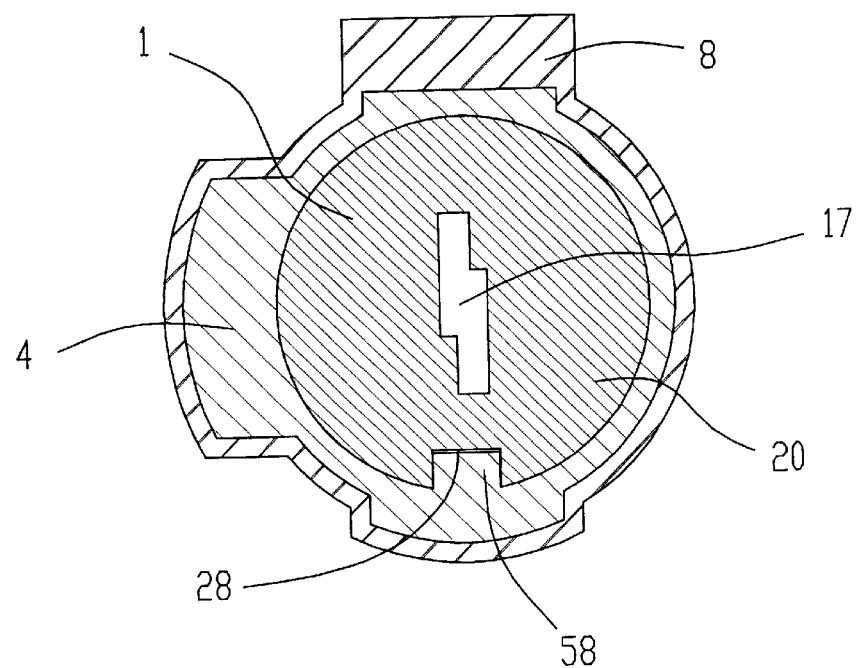
FIG. 11 is an enlarged cross sectional view of FIG. 3 taken along line B—B.
Figure 14A:
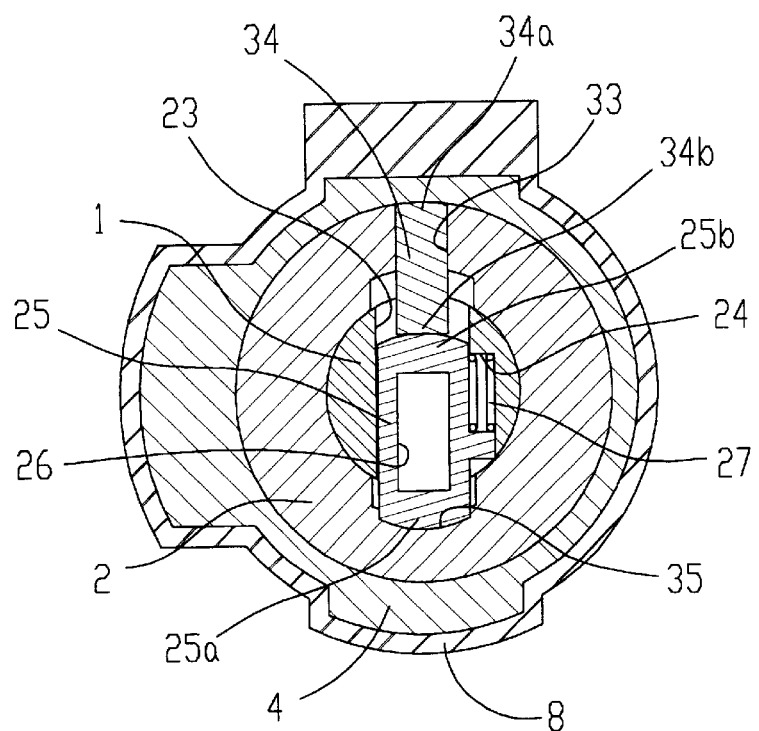
Figure 14B:
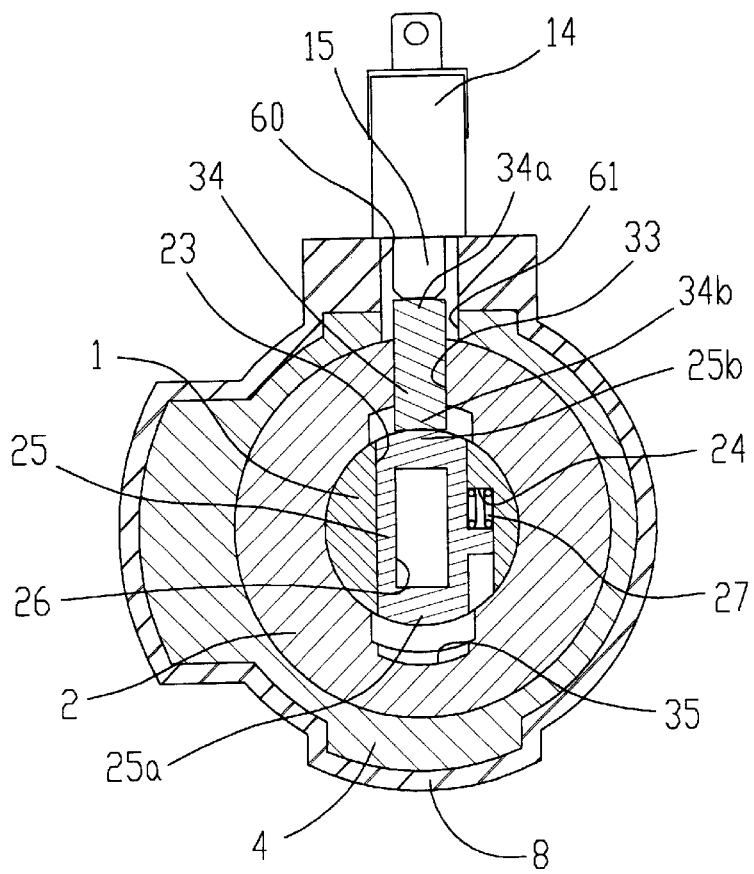
FIG. 14B is an enlarged cross sectional view of FIG. 13 taken along line D—D.

On the front side of the key cylinder 1, there is provided a brim-like portion 20 protruding annularly, and on the front face of the brim-like portion 20, there is secured the operating knob 21. Inside the operating knob 21, there is provided a key installation hole 22 for enabling insertion of the mechanical key to the key insertion hole 17. As shown in FIG. 11, an engagement groove 28 that engages with a later-described engagement protruding portion 58 of the holder 4 is provided on the lower side of the brim-like portion 20 in the drawing. Further, the key cylinder 1 is provided with a hole 23 formed in radial direction and a spring installation hole 24 connected to the hole 23 between the brim-like portion 20 and the tumbler hole 18 as shown in FIG. 14A. In the hole 23, a slider 25 having a rectangular introduction hole 26 for introducing a mechanical key is movably provided and pressed in the radial direction by a spring 27 installed in the spring installation hole 24. When a mechanical key is not inserted into the key cylinder 1, a top end portion 25a of the slider 25 projects from the outer circumferential face of the key cylinder 1 to prevent rotation of the key cylinder 1 against the rotor 2 in cooperation with the tumblers 19. When a mechanical key is inserted into the key cylinder 1, the slider 25 moves to the position where the top end portion 25a and a rear end portion 25b thereof are aligned with the outer circumferential face of the key cylinder 1 as shown in FIG. 14B.

As shown in FIG. 1, on the end portion side of the key cylinder 1 opposite to the brim-like portion 20, a C ring 30 is installed for securing the key cylinder 1 on the rotor 2. The C ring 30 is installed on the key cylinder 1 after the key cylinder 1 is inserted into the rotor 2 from the right side of the drawing, thereby preventing the rotor 2 from detaching from the key cylinder 1. The outside diameter of the C ring 30 is almost equal to the outside diameter of the rotor 2. Also, on the rear end portion of the key cylinder 1, there is formed the connection protruding portion 1a protruding to the rear side for connecting the key cylinder 1 to the cam member 5.

The rotor 2 has a cylinder shape, and a pair of tumbler engagement grooves 32 are formed along the axial direction in symmetrical positions on the inner circumferential face. The top end portion of the tumbler 19 protruding from the outer circumferential face of the key cylinder 1 engages with the tumbler engagement groove 32 to disable the key cylinder 1 from rotating. As shown in FIG. 14A, the rotor 2 is provided with a through-hole 33 penetrating in the radial direction that is formed in a position corresponding to the hole 23 of the key cylinder 1. In the through-hole 33, there is movably provided an engaged member 34 whose end portion comes into contact with the rear end portion 25b of the slider 25 of the key cylinder 1. In a position opposed to the through-hole 33 on the rotor 2, there is formed a fitting groove 35 which is connected to the tumbler engagement groove 32 and in which the top end portion 25a of the slider 25 of the key cylinder 1 fits.

The engaged member 34 moves with the slider 25 upon insertion of a mechanical key into the key cylinder 1 and presses the actuating lever 15 of the key detection switch 14, by which the key detection switch 14 is turned on. When a mechanical key is not inserted, the engaged member 34 is positioned so as to cross over the key cylinder 1 and the rotor 2, and a top end portion 34a thereof matches with the outer circumferential face of the rotor 2. With a mechanical key being inserted as shown in FIG. 14B, the engaged member 34 moves with the slider 25 so that the top end portion 34a thereof projects from the outer circumferential face of the rotor 2, and a contact face between a rear end portion 34b of the engaged member 34 and the rear end portion 25b of the slider 25 aligns with a contact face between the key cylinder 1 and the rotor 2, which releases connection between the key cylinder 1 and the rotor 2.

Also, as shown in FIG. 1, on the outer circumferential face of the rotor 2, there are formed a semispherical first fitting hole 40 for fitting part of a ball 39 that is disposed in the body 8 and pressed by a ball spring 38 to the side of the rotor 2 when the rotor 2 is in the front position, and a semispherical second fitting hole 41 for fitting part of the ball 39 when the rotor 2 is in the rear position. The ball 39 and these two fitting holes 40, 41 generate a clicking feel when the rotor 2 is moved from the front position to the rear position or from the rear position to the front position, thereby ensuring movement of the rotor 2 to the front position or the rear position.

Figure 8A:
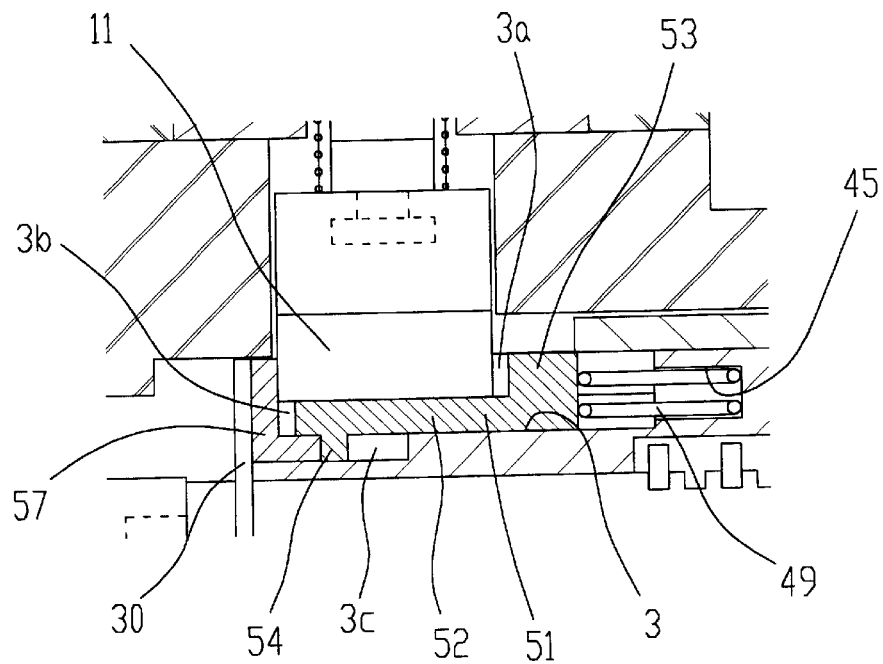
Figure 12:
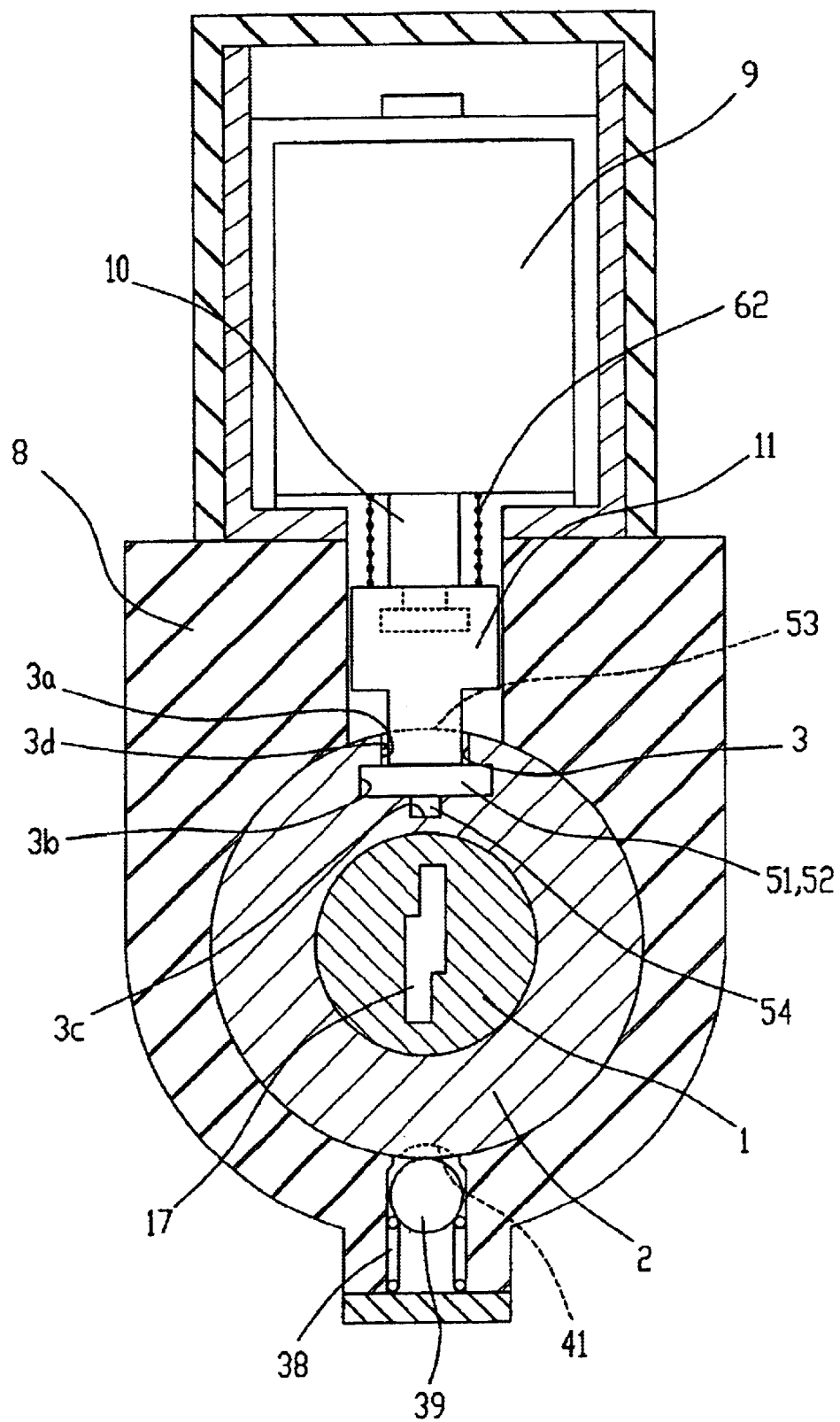
FIG. 12 is an enlarged cross sectional view of FIG. 3 taken along line C—C.

On the outer circumferential face of the rotor 2, there is provided the slide groove (engagement recess portion) 3 that engages with the lock member 11 and disables the rotor 2 from rotating. As shown in FIG. 8A, the slide groove 3 is provided from the rear end portion to the approximate central portion on the outer circumferential face of the rotor 2, and on a lateral wall on the central side of the slide groove 3, a spring installation hole 45 is provided in the axial direction. As shown in FIG. 12, the cross section of the slide groove 3 is composed of, from the upper side, an upper groove portion 3a in which the lock member 11 is inserted, a middle groove portion 3b in which a later-described substrate portion 52 of a slide member 51 fits for preventing the slide member 51 from slipping out to the upper side, and a lower groove portion 3c for restraining a movement range of the slide member 51.

Figure 8B:
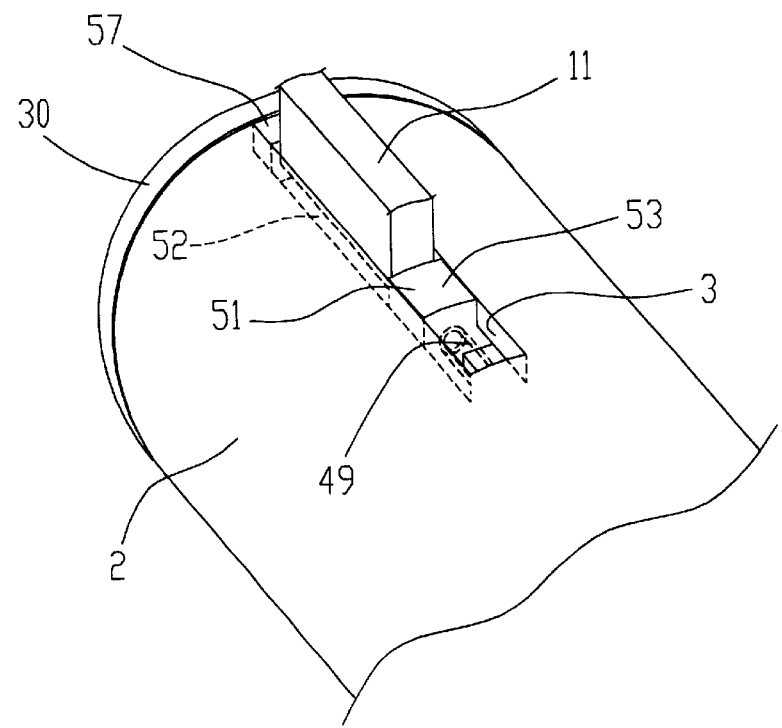
FIG. 8B is a fragmental perspective view of FIG. 8A.

The slide member 51 operates when the lock member 11 gets out of the slide groove 3 for preventing re-insertion of the lock member 11 into the slide groove 3. As shown in FIGS. 8A and 8B, the slide member 51 is disposed movably in the slide groove 3, and pressed to the rear end portion side by a slide spring 49 disposed in the spring installation hole 45. Also, the extraction of the slide member 51 from the slide groove 3 is prevented by a lid member 57 fit in the rear end portion of the slide groove 3 and fixed by the C ring 30.

The slide member 51 is composed of the substrate portion 52 and a protruding portion 53 protruding from the top face of the substrate portion 52, whose top face is aligned with the outer circumferential face of the rotor 2. A protruding portion 54 protruding from the bottom face of the substrate portion 52 is also formed on the end portion of the slide member 51 opposite to the protruding portion 53. The protruding portion 54, which is slidable in forward and backward directions in the lower groove portion 3c of the slide groove 3, comes into contact with the end face of the lower groove portion 3c and the lid member 57 to restrain movement of the slide member 51 in a specified range.

Figure 4:
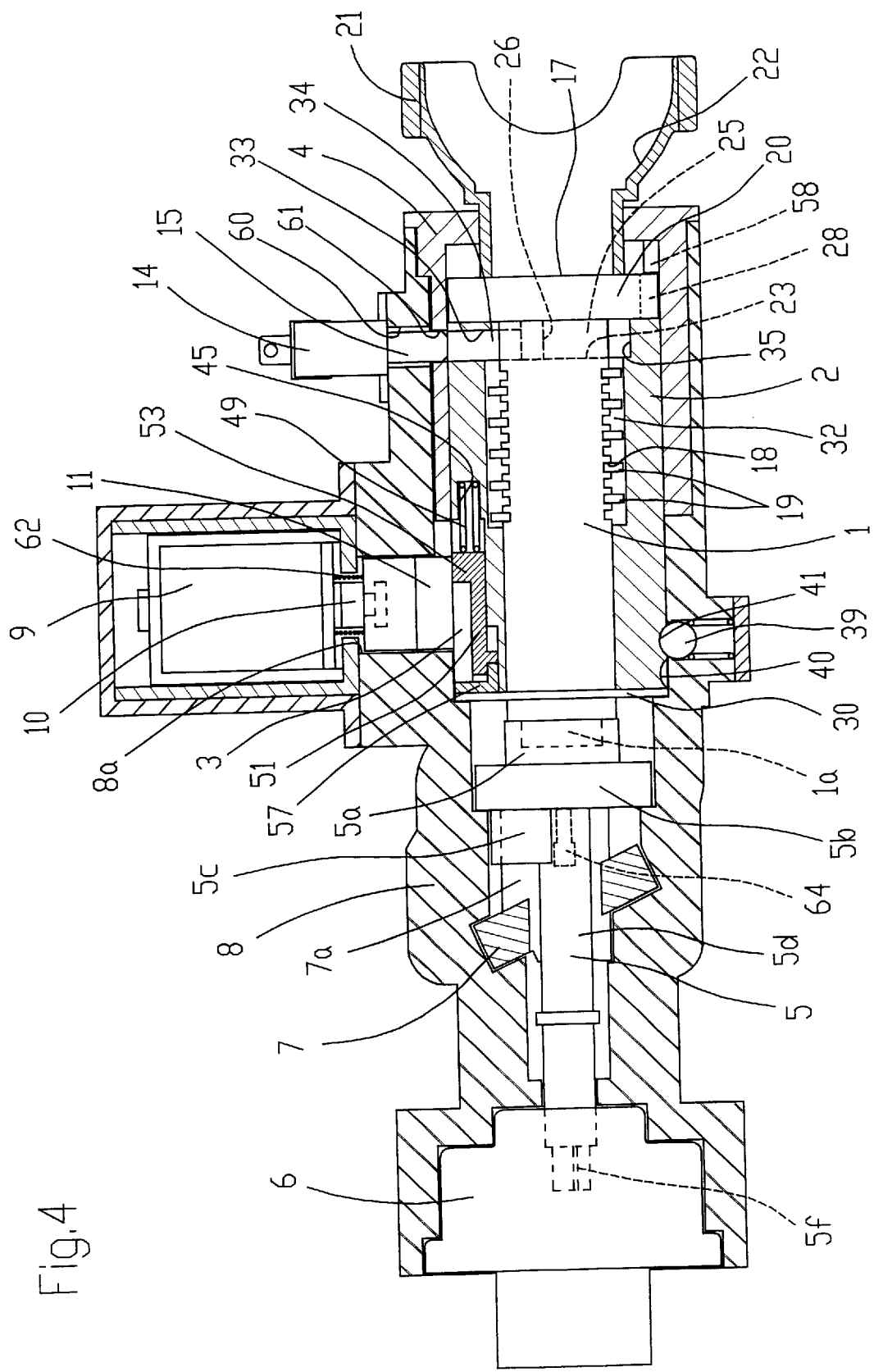
FIG. 4 is a cross sectional view showing the steering lock apparatus of the present invention in the state of being unlocked.

As shown in FIG. 1, the holder 4 is for holding the rotor 2 rotatably and movably in forward and backward directions. The holder 4 has an approximate cylinder shape, and on the front side of the inner circumferential wall of the holder 4, there is provided an engagement protruding portion (prevention means) 58 that fits in an engagement groove (prevention means) 28 formed on the brim-like portion 20 of the key cylinder 1 to prevent rotation of the key cylinder 1 when the key cylinder 1 is placed in a position other than the rear position shown in FIG. 4. A space between the engagement protruding portion 58 and the lateral wall 3d of the engagement groove 28 is a space that does not bring the lock member 11 into contact with the lateral wall of the slide groove 3 of the rotor 2 if rotating operation of the key cylinder 1 is conducted. Also, in a specified position on a circumferential wall of the holder 4, there is provided the through-hole 61, through which the top end portion of the actuating lever 15 of the key detection switch 14 that detects insertion of a mechanical key into the key cylinder 1 is inserted.

The switch portion 6 is for detecting the cam member 5 being moved to the rear side. When the switch portion 6 detects that the key cylinder 1 and the rotor 2 are operated to the rear side and the cam member 5 is moved, an unshown controller is activated to receive an unlocking signal from an unshown electronic key, and if the unlocking signal is a proper signal, the controller operates the electromagnetic solenoid 9 for a certain period of time.

The electromagnetic solenoid 9 operates upon reception of a signal from the controller, and in operation of the electromagnetic solenoid 9, the driving shaft 10 is structured to move to the side of the electromagnetic solenoid 9. On the top end portion of the driving shaft 10, there is secured the lock member 11 that engages with the slide groove 3 of the rotor 2 for preventing rotation of the rotor 2. Between the lock member 11 and the electromagnetic solenoid 9, a spring 62 is provided around the driving shaft 10, and when the electromagnetic solenoid 9 is not operated, pressing force of the spring 62 presses the lock member 11 to the side of the rotor 2.

As shown in FIG. 2, the lock shaft 7 is movably installed in a hole 8b of the body 8, and a following portion 7a that engages with the cam member 5 is provided on the rear end portion thereof. On the following portion 7a, there is formed a pin installation hole 67 for installing a pin 64 and a pin spring 65, and the pin 64 and the pin spring 65 are housed in the pin installation hole 67 by a plug 66. The pin 64 is pressed toward a later-described large diameter potion 5b of the cam member 5 by the pin spring 65. Also, the lock shaft 7 is pressed toward the steering shaft by a lock spring 69 disposed between the following portion 7a and a lid portion 68 covering a lower opening portion of the body 8.

The cam member 5 is provided, with a connection portion 5a connected to the key cylinder 1, a large diameter portion 5b that is rotatable in the state of being supported on the inner circumferential face of the body 8, a cam portion 5c that engages with the following portion 7a formed on the end portion of the lock shaft 7 for pulling the lock shaft 7 into the body 8, and an axis portion 5d whose end portion 5f is connected to the switch portion 6.

The following description discusses operation of the steering lock apparatus having the above-described structure.

First, in a locking state shown in FIG. 1 and FIG. 2, the electromagnetic solenoid 9 is in an off state, where the lock member 11 pressed to the side of the rotor 2 by the spring 62 is in contact with the substrate portion 52 of the slide member 51 in the slide groove 3. Here, since the key cylinder 1, the rotor 2 and the cam member 5 are placed in the front position and the engagement protruding portion 58 of the holder 4 is fit in the engagement groove 28 of the key cylinder 1, the key cylinder 1 cannot be rotated if rotating operation of the operating knob 21 is attempted. Also, since a mechanical key is not inserted in the key insertion hole 17 of the key cylinder 1 so that the tumblers 19 are protruding from the lateral wall of the key cylinder 1 and are in engagement with the tumbler engagement grooves 32 of the rotor 2, the rotor 2 cannot be rotated either.

Figure 3:
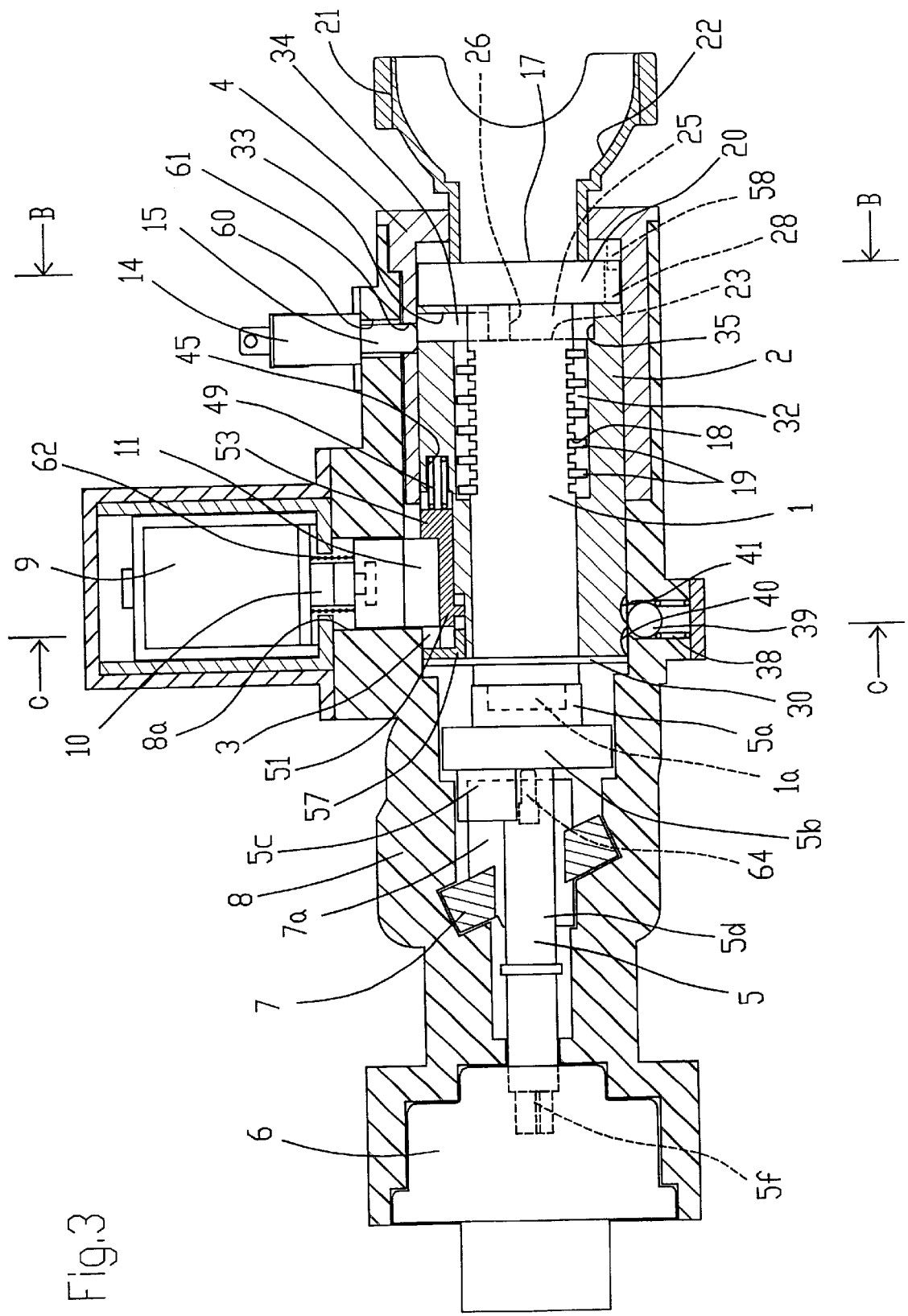
FIG. 3 is a cross sectional view showing the steering lock apparatus of the present invention in an engagement release position.

When a driver carrying an electronic key presses the operating knob 21 to the rear side, the key cylinder 1 moves together with the rotor 2 and the cam member 5 to the rear side inside the body 8. When the rotor 2 reaches an engagement release position (position show in FIG. 3) provided between the front position and the rear position, the switch portion 6 detects that the operating knob 21 is operated. Accordingly, the switch portion 6 transmits a signal to an unshown controller, which receives an unlocking signal transmitted from the electronic key and determines if the signal is proper or not.

Figure 9A:
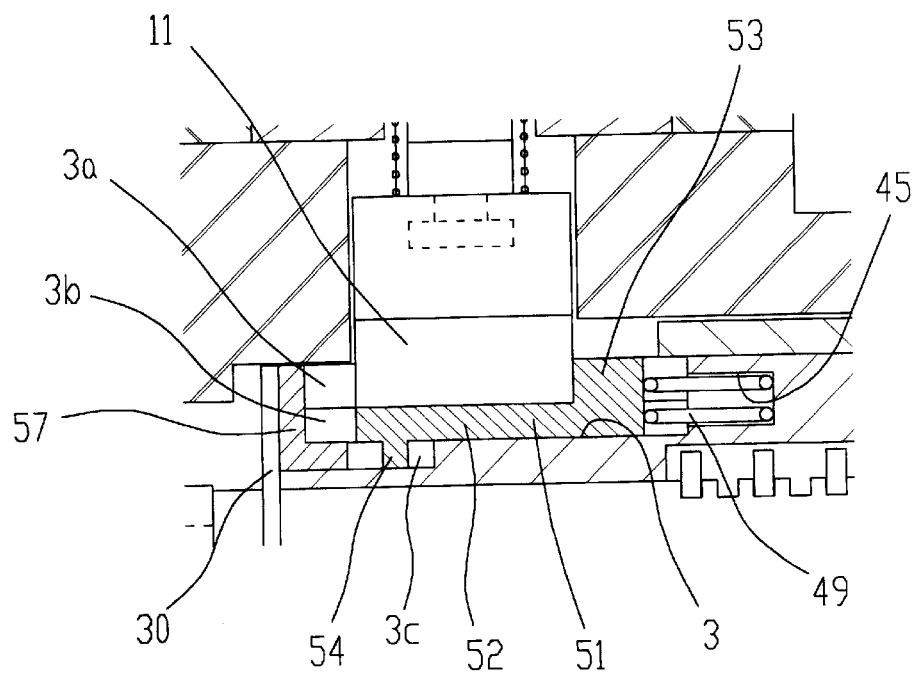
Figure 9B:
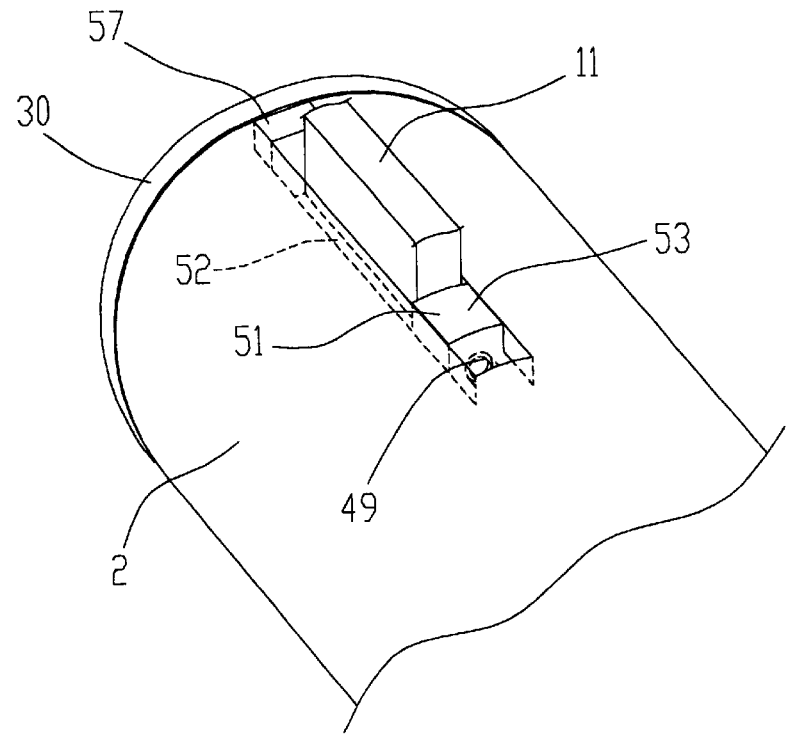
FIG. 9B is a fragmental perspective view of FIG. 9A.

When the controller determines that the signal is not a proper signal, the electromagnetic solenoid 9 does not operate. Consequently, if the key cylinder 1, the rotor 2 and the cam member 5 are moved to the rear side in this state, the lock member 11 is maintained as shown in FIGS. 9A and 9B in the state of being inserted in the slide groove 3 to prevent rotation of rotor 2, so that rotating operation of the rotor 2 is not possible even if operation of rotor 2 to the rear position is achieved.

If the controller determines that the signal is a proper signal, the electromagnetic solenoid 9 operates to move the lock member 11 upward for a certain period of time, by which the lock member 11 goes out of the slide groove 3 of the rotor 2. It should be noted that in the engagement release position (position show in FIG. 3) where the lock member 11 goes out of the slide groove 3, the engagement groove 28 formed on the brim-like portion 20 of the key cylinder 1 is still in engagement with the engagement protruding portion 58 of the holder 4 (see FIG. 11), so that even if the driver applies rotating operation force to the operating knob 21, the key cylinder 1 and the rotor 2 cannot be rotated. This prevents the lock member 11 from being pressed and caught by the lateral wall 3d of the slide groove 3 of the rotor 2, which enables the lock member 11 to smoothly go out of the slide groove 3. Also, providing an overlapping margin of the engagement groove 28 and the engagement protruding portion 58 so as to make a period of time, taken for the lock member 11 to move from the engagement release position to a further rear side to detach the engagement protruding portion 58 from the engagement groove 28, longer than a period of time for the switch portion 6 to detect movement of the cam member 5 and to operate the electromagnetic solenoid ensures prevention of the lock member 11 from being pressed and caught by the lateral wall of the slide groove 3, and eliminates a disadvantage such as the lock member 11 being inoperative.

When engagement between the lock member 11 and the slide groove 3 is released, pressing force of the slide spring 49 moves the slide member 51 inside the slide groove 3 toward the rear side up to the position where the protruding portion 54 of the slide member 51 comes into contact with the lid member 57. When the key cylinder 1, the rotor 2 and the cam member 5 move to the rear position, the engagement protruding portion 58 of the holder 4 gets out of the engagement groove 28 of the key cylinder 1, which makes the key cylinder 1 rotatable. In such a structure, the electromagnetic solenoid 9 should be operated for just a short period of time till the slide member 51 is moved to the end portion of the slide groove 3 by pressing force of the slide spring 49, and therefore required power is also very small.

Figure 10A:
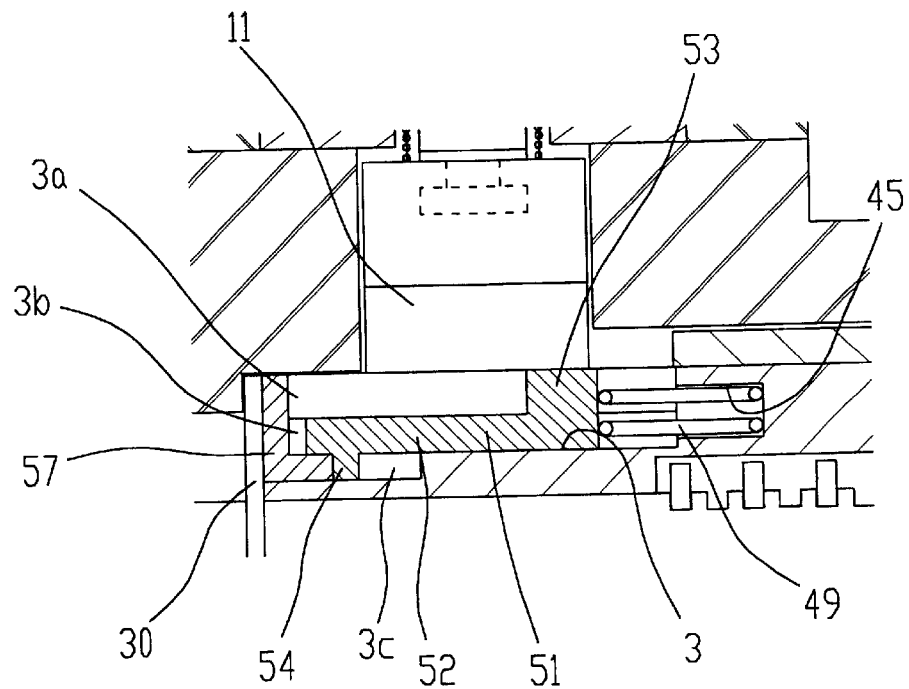
Figure 10B:
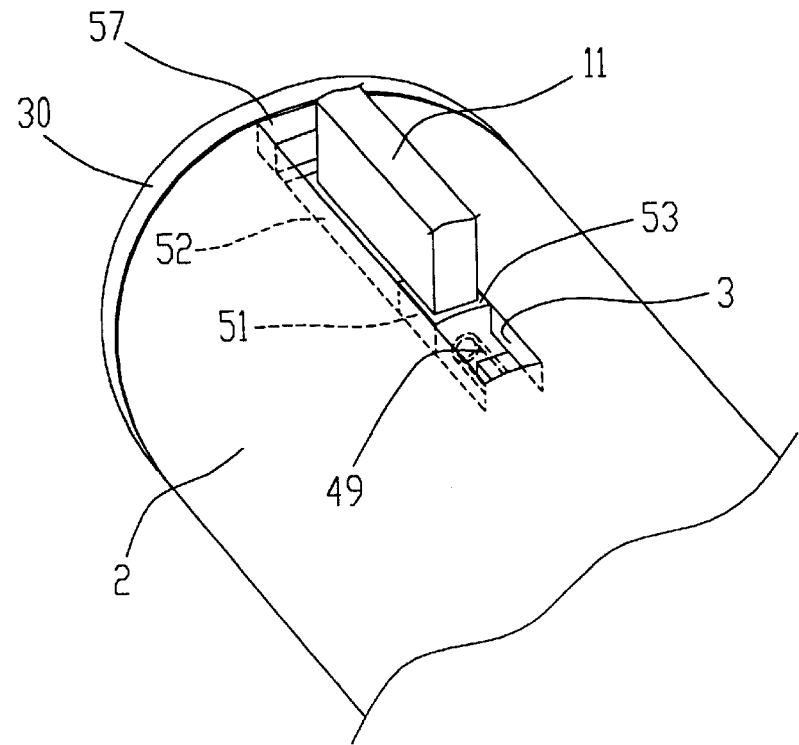
FIG. 10B is a fragmental perspective view of FIG. 10A.

When operation of the electromagnetic solenoid 9 is completed, the lock member 11 is lowered by pressing force of the spring 62 and brought into contact with the top face of the protruding portion 53 of the slide member 51 as shown in FIGS. 10A and 10B. When the operating knob 21 is operated in this state to rotate the rotor 2 together with the key cylinder 1, the lock member 11 slides on the outer circumferential wall of the rotor 2 and the top face of the protruding portion 53 of the slide member 51, which prevents the lock member 11 from re-entering into the slide groove 3 regardless of the rotational position to which the rotor 2 is rotated.

Figure 5:
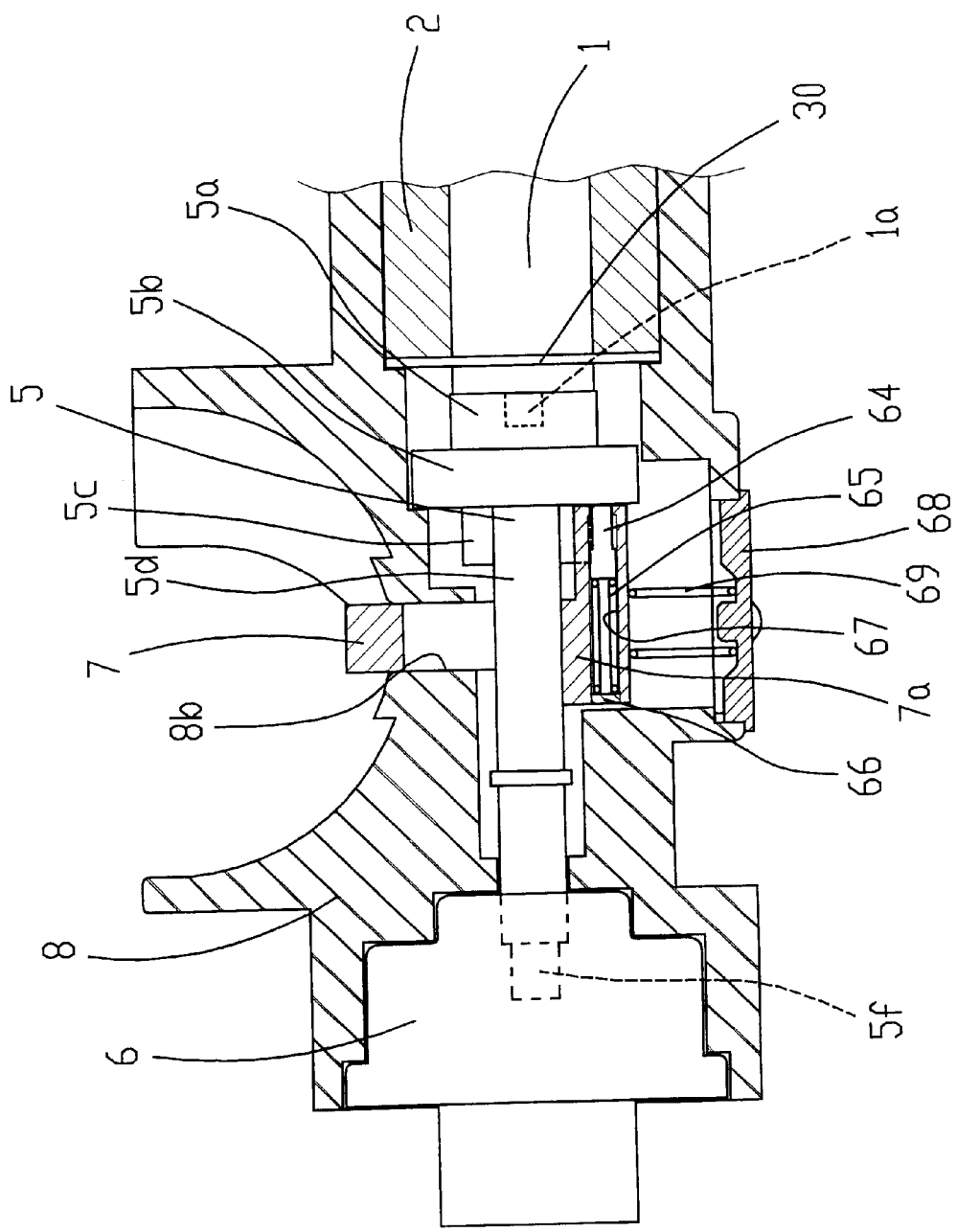
FIG. 5 is a cross sectional view showing the state of a lock shaft in the case where an operating knob is operated to a rear position.

As shown in FIG. 5, with movement of the cam member 5, the pin 64 of the lock shaft 7 is pressed into the pin installation hole 67 by the lateral wall of the large diameter potion 5b of the cam member 5 against pressing force of the pin spring 65.

Figure 6:
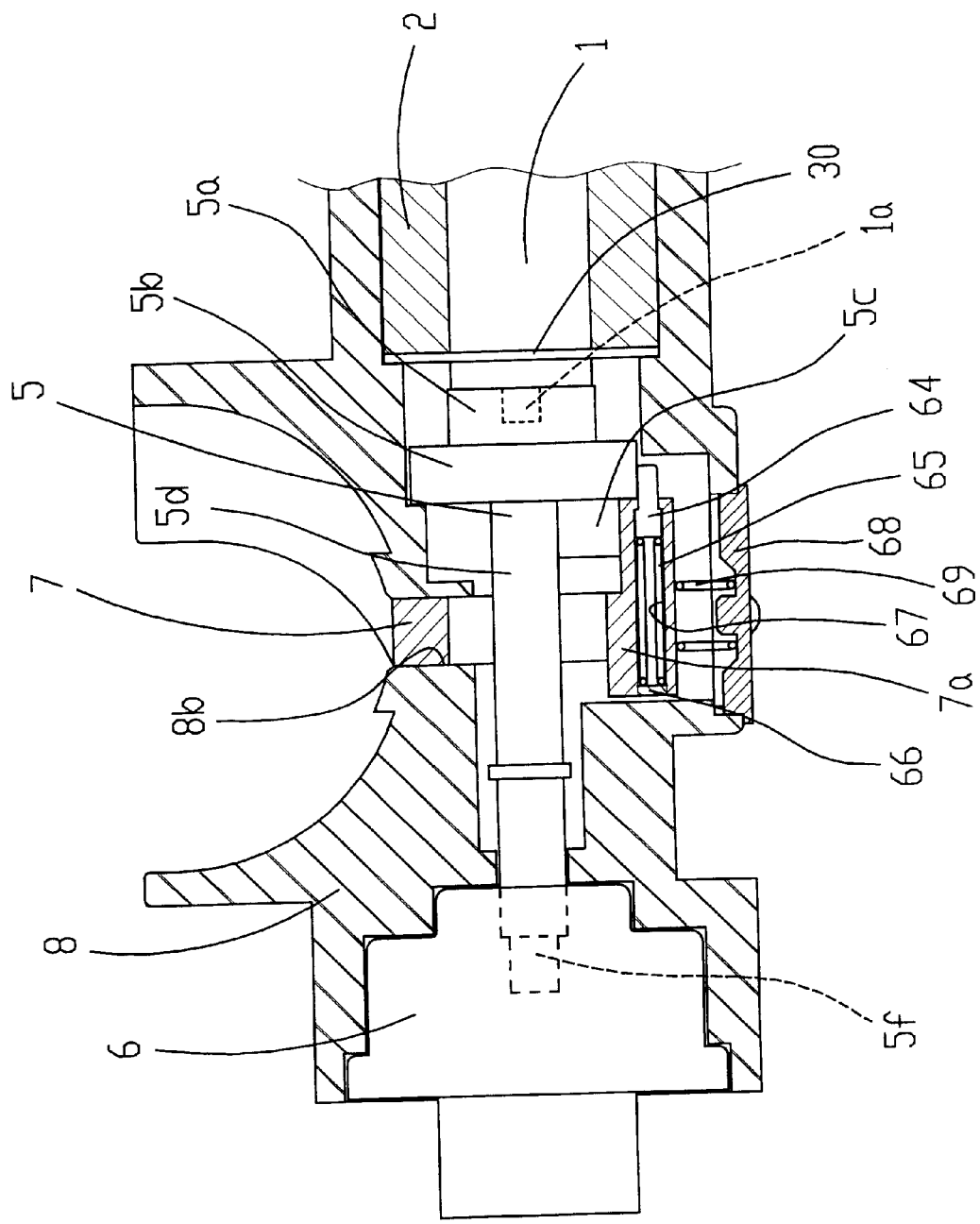
FIG. 6 is a cross sectional view showing the state of the lock shaft in the case where the operating knob is operated from LOCK position to ACC position.
Figure 7:
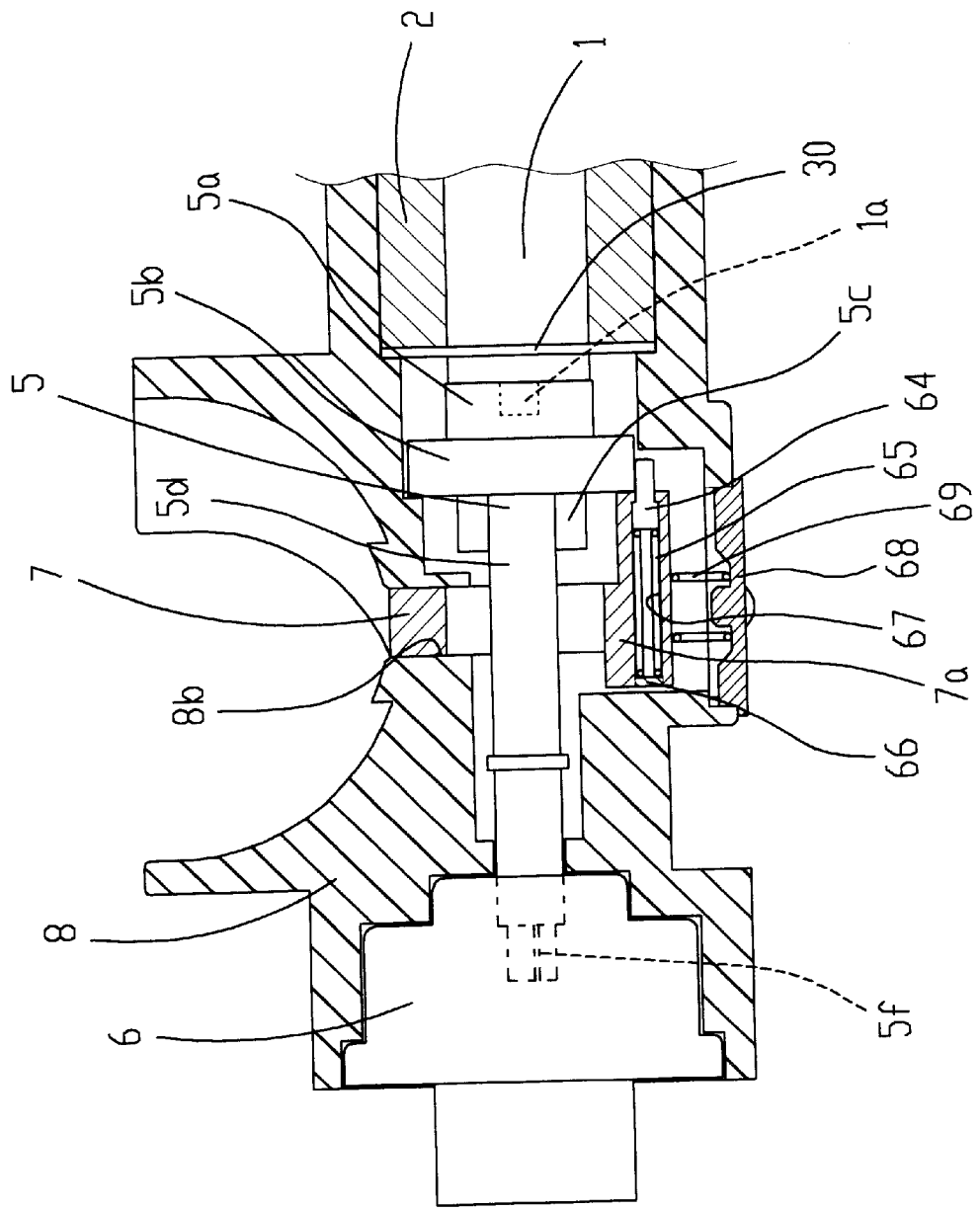
FIG. 7 is a cross sectional view showing the state of the lock shaft in the case where the operating knob is operated from ACC position to LOCK position.

For unlocking the lock of the steering shaft, the operating knob 21 is rotated by approx. 90 degrees from LOCK position to ACC position. Consequently, as shown in FIG. 6, with the aid of the cam portion 5c of the cam member 5, the following portion 7a of the lock shaft 7 moves downward against pressing force of the lock spring 69 so that the top end portion of the lock shaft 7 sinks into the body 8, which releases engagement between the steering shaft and the lock shaft 7. In this point, the pin 64 of the following portion 7a of the lock shaft 7 moves to the lower side of the large diameter potion 5b in the drawing, so that by pressing force of the pin spring 65, the pin 64 projects under the large diameter potion 5b of the cam member 5. If the operating knob 21 is operated again in this state to rotate it back to the LOCK position, engagement of the pin 64 with the large diameter portion 5b is maintained as shown in FIG. 7 and therefore the lock shaft 7 does not move. Accordingly, once the cam member 5, the key cylinder 1, and the rotor 2 are operated to be in the rear position, and the lock of the steering shaft is unlocked, the steering shaft will not be locked regardless of the rotational position to which the operating knob 21 is rotated.

When the driver gets out of an automobile, the driver rotates the operating knob 21 to LOCK position and then pulls the operating knob 21 to the front side, so that the key cylinder 1, the rotor 2, the cam member 5 and the slide member 51 move to the front position, and contact between the lock member 11 and the protruding portion 53 of the slide member 51 is released, as a consequence of which the lock member 11 pressed by the spring 62 enters into the slide groove 3 of the rotor 2 and comes into contact with the substrate portion 52 of the slide member 51, by which the rotor 2 is locked. Here, movement of the cam member 5 releases engagement between the pin 64 of the lock shaft 7 and the large diameter potion 5b of the cam member 5, and pressing force of the lock spring 69 moves the lock shaft 7 to the side of the steering shaft, by which the steering shaft is locked.

The following description discusses the case of unlocking the steering lock with use of a mechanical key.

Figure 13:
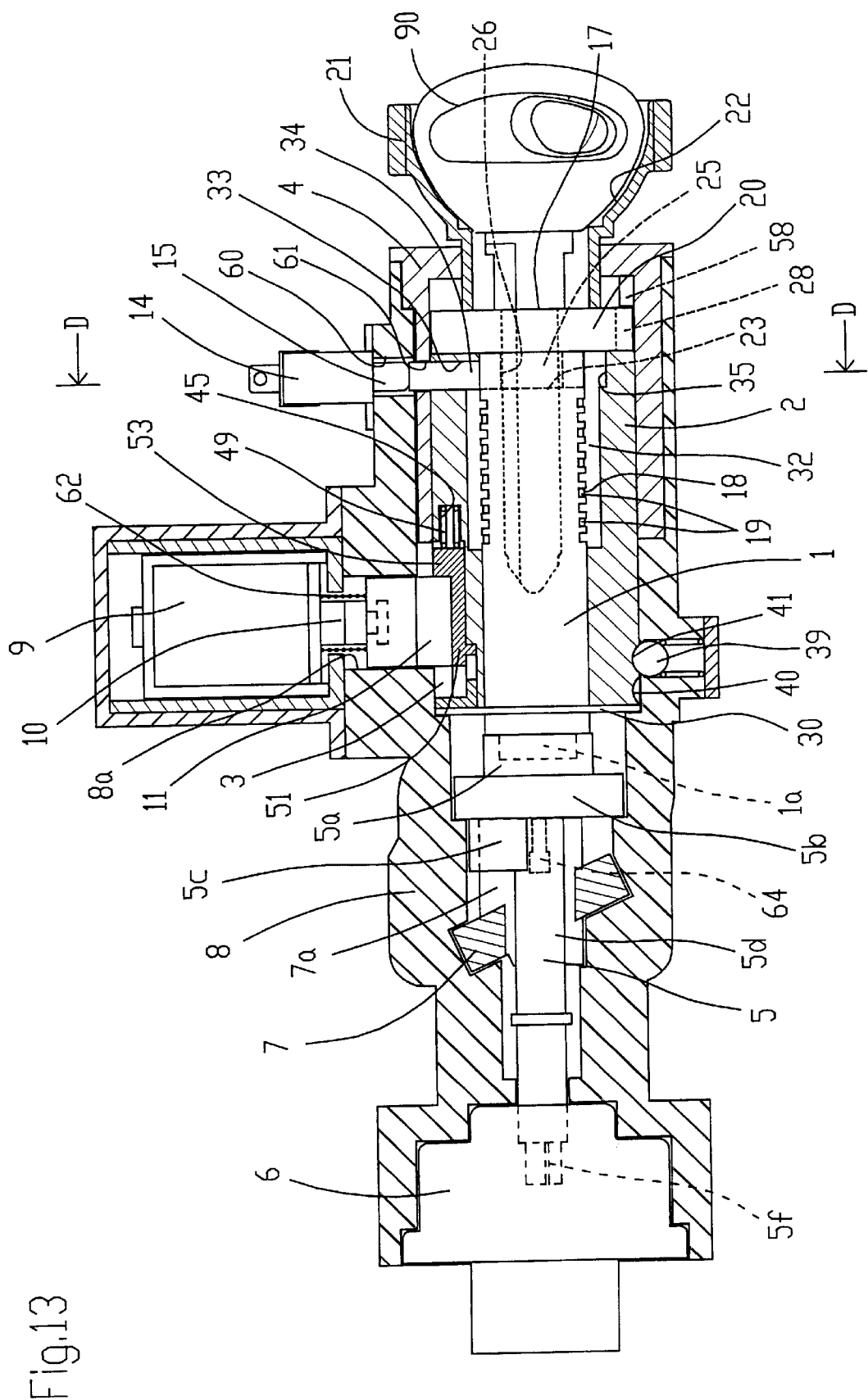
FIG. 13 is a cross sectional view showing the steering lock apparatus of the present invention with a mechanical key inserted therein.

When a mechanical key 90 is inserted into the key insertion hole 17 of the key cylinder 1, an inclined portion on the top end of the mechanical key 90 comes into contact with the slider 25 and attempts to move the slider 25 toward the upper side in the drawing in the state shown in FIG. 13. However, since the engaged member 34 that is in contact with the slider 25 is in contact with the inner circumferential wall of the holder 4, the slider 25 cannot be moved. When the mechanical key 90 is further pushed in this state, the key cylinder 1 and the rotor 2 move together to the rear position while the inclined portion on the top end of the mechanical key 90 and the slider 25 are in engagement with each other. Consequently, as shown in FIG. 13 and FIG. 14B, the through-hole 33 of the rotor 2, the through-hole 61 of the holder 4, and the switch introduction hole 60 of the body 8 are linearly connected, as a consequence of which the engaged member 34 pressed by the slider 25 escapes from the key cylinder 1 into the switch introduction hole 60 of the body 8 and presses the actuating lever 15 of the key detection switch 14 to turn the key detection switch 14 on. At this time, since a contact face between the engaged member 34 and the slider 25 is aligned with a contact face between the key cylinder 1 and the rotor 2, the engaged member 34 releases the connection of the key cylinder 1 and the rotor 2. The movement of the slider 25 makes it possible to insert the mechanical key 90 into the key cylinder 1, and then when the mechanical key 90 is inserted completely, the tumblers 19 sink into the key cylinder 1, which enables the key cylinder 1 to rotate against the rotor 2. Further, since the engaged member 34 is positioned so as to cross over between the rotor 2 and the holder 4, the rotor 2 is brought into connection with the holder 4.

When the key is extracted from the key cylinder 1, the tumblers 19 are returned to the state of projecting from the outer circumferential face of the key cylinder 1, and further the slider 25 is moved to the lower side of the drawing by pressing force of the spring 27, so that the engaged member 34 gets out of the switch introducing hole 60 to release connection of the holder 4 and the rotor 2. Then, when the operating knob 21 is operated to the front position, the key cylinder 1, the rotor 2, and the cam member 5 move to the front position, by which the locking state is regained.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A steering lock apparatus comprising: a rotational member having an engagement recess portion; an operating portion positioned in a front side of the rotational member and connected to the rotational member; a holder for holding the rotational member movably in forward and backward directions and for holding the same rotatably in a rear position; an actuator driven by a signal transmitted by a controller upon detection of the rotational member being operated to a rear side; and a lock member that is operated by the actuator and inserted into the engagement recess portion of the rotational member for preventing rotation of the rotational member, wherein an engagement release position where engagement of the engagement recess portion of the rotational member and the lock member is released is provided between a front position and a rear position, and a prevention means for preventing rotation of the rotational member is provided so as to prevent engagement of the lock member and a lateral wall of the engagement recess portion of the rotational member in the engagement release position.

* * * * *